United States Patent
Roth et al.

(10) Patent No.: US 8,817,340 B2
(45) Date of Patent: Aug. 26, 2014

(54) LARGE-FORMAT SCANNING SYSTEM

(75) Inventors: Johannes Roth, Betzdorf (DE); Gerd Ermert, Weitefeld (DE)

(73) Assignee: Roth+Weber GmbH, Niederdreisbach (DE)

( * ) Notice: Subject to any disclaimer, the term of this patent is extended or adjusted under 35 U.S.C. 154(b) by 0 days.

(21) Appl. No.: 14/005,856

(22) PCT Filed: Apr. 18, 2012

(86) PCT No.: PCT/EP2012/001670
§ 371 (c)(1),
(2), (4) Date: Oct. 18, 2013

(87) PCT Pub. No.: WO2012/143124
PCT Pub. Date: Oct. 26, 2012

(65) Prior Publication Data
US 2014/0029071 A1  Jan. 30, 2014

(30) Foreign Application Priority Data
Apr. 21, 2011  (DE) .......................... 10 2011 018 381

(51) Int. Cl.
*H04N 1/04* (2006.01)
*H04N 1/193* (2006.01)
*H04N 1/10* (2006.01)
*H04N 1/19* (2006.01)
*H04N 1/387* (2006.01)

(52) U.S. Cl.
CPC ............... *H04N 1/10* (2013.01); *H04N 1/1933* (2013.01); *H04N 1/04* (2013.01); *H04N 1/1903* (2013.01); *H04N 1/387* (2013.01); *H04N 1/3876* (2013.01)
USPC ............................. 358/474; 358/497; 358/486

(58) Field of Classification Search
CPC ............ H04N 1/0035; H04N 1/00525; H04N 1/00559; H04N 1/00811; H04N 1/0097; H04N 1/02815; H04N 1/32; H04N 1/393; H04N 5/235; H04N 58/335; H04N 5/355; H04N 5/361; H04N 5/37542
USPC .......... 358/474, 497, 496, 486, 513, 514, 512
See application file for complete search history.

(56) References Cited

U.S. PATENT DOCUMENTS 4,149,091 A * 4/1979 Crean et al. .................... 250/566
4,631,598 A * 12/1986 Burkhardt et al. ............ 358/425
(Continued)

FOREIGN PATENT DOCUMENTS

| DE | 3924757 A | 2/1990 |
|---|---|---|
| JP | 9027889 B | 1/1997 |
| JP | 2006313995 B | 11/2006 |

*Primary Examiner* — Negussie Worku
(74) *Attorney, Agent, or Firm* — Andrew Wilford

(57) ABSTRACT

The invention relates to a large-format scanning system (1) comprising at least two image acquisition elements (2) in a cascade arrangement, at least one platen, preferably a glass plate (3), arranged upstream thereof, and at least two reflector rolls (5) arranged opposite the at least two image acquisition elements (2) in a cascade arrangement, said reflector rolls being pressed against the glass plate (3) and/or a copy (4) to be scanned by means of resilient elements (6) that are arranged at the sides of the reflector rolls (5). According to the invention, the side portions (7) of the reflector rolls (5) are designed such that they touch the glass plate (3) only outside the reading area of the image acquisition elements (2) for the copy to be scanned (4) and that the copy to be scanned (4) rests on the glass plate (3) in the center area (8) of the reflector rolls (5).

8 Claims, 1 Drawing Sheet

(56) References Cited

U.S. PATENT DOCUMENTS

| | | | |
|---|---|---|---|
| 4,712,134 A * | 12/1987 | Murakami | 358/482 |
| 4,774,592 A * | 9/1988 | Suzuki et al. | 358/451 |
| 4,970,606 A | 11/1990 | Shima | |
| 4,972,273 A * | 11/1990 | Burkhardt et al. | 358/443 |
| 5,144,448 A * | 9/1992 | Hornbaker et al. | 348/324 |
| 5,532,845 A * | 7/1996 | Gusmano | 358/474 |
| 7,643,769 B2 * | 1/2010 | Akazawa | 399/82 |
| 2008/0297865 A1 | 12/2008 | Hara | |

* cited by examiner

LARGE-FORMAT SCANNING SYSTEM

CROSS REFERENCE TO RELATED APPLICATIONS

This application is the US-national stage of PCT application PCT/EP2012/001670 filed 18 Apr. 2012 and claiming the priority of German patent application 102011018381.7 itself filed 21 Apr. 2011.

The invention relates to a large-format scanning system with at least two cascaded image-capturing elements, at least one glass plate disposed in front of them, and respective cascaded reflector rollers opposite the at least two cascaded image-capturing elements and pressed against the glass plate and/or an original by biasing elements at the ends of the reflector rollers.

Devices with continuous image-capturing elements, for example contact image sensors (CISs) that cover the complete scan width are known in the field of large-format scanning systems. A continuous, driven reflector roller, for example, presses the original against the glass plate of the image-capturing element. This is necessary to generate a scanned image of the required sharpness.

Contact with the original or with the reflector roller erodes the glass plate; depending on the size of the original, the roller touches the glass plate when the original only partially covers the reflector roller. As a consequence, errors occur in the scanned image requiring replacement of the glass plate.

The disclosure of JP 9 027 889 for example provides that, with driven reflector rollers it is possible to reduce wear by providing a defined gap between each reflector roller and the glass plate. This defined spacing relative to the glass plate is created to this end by spacer disks mounted outside the scan path.

However, large-scale scanning systems of this kind suffer from the following disadvantages: due to the continuous CISs, they are expensive, and in addition the driven, continuous reflector roller is very expensive.

Moreover, for example, US 2008/0297865 A1 discloses a large-scale scanning system with image-capturing elements that are cascaded, for example CISs. The used CISs are typically employed in large numbers for small-scale scanning systems in office applications; they can thus be produced cost efficiently. When used in large-format scanning systems cascaded, an enormous cost advantage results in contrast to one-piece, long CIS devices. According to US 2008/0297865, the image-capturing elements are set in steps and are associated with driven and idling deflector pulleys that extend over the total width of the glass plate and are also expensive, a belt being spanned around the deflector pulleys.

JP 2006 313 995 discloses a plurality of image-capturing elements in two steps that are adjacent to each other. Opposite these two steps are, also over the total width thereof, two expensive, driven reflector rollers and/or shafts that are supported at their ends and that are also expensive and upon which discontinuous reflector rollers are disposed.

DE 39 24 757 [U.S. Pat. No. 4,970,606] only discloses an image-capturing element that has a reflector roller bearing on the glass plate outside the effective length of the image-capturing element in such a manner that the originals can only be transported between the supports. A cost-effective arrangement of the cascaded image-capturing elements and of the respective reflector rollers is not possible, because the reflector roller support interferes with transporting of the originals.

The image-capturing elements that are cascaded, which is also known as a zigzag alignment, is necessary to obtain a continuous scanned image over the complete scanning width. The offset and/or overlap of individual CISs parallel to the x- and y-axes is corrected by suitable software methods, for example so-called stitching processes, to obtain a continuous scanned image.

With processes of this kind, it is basically necessary to press the reflector rollers against the glass plate, for example by spring contact pressure, as will be described below based on the figures. The reason for this is that the image-capturing elements as well as a CIS typically have minimal focal depths. This is why the reflector rollers press the original against the glass plate to ensure that image detection lies in the focus plane of the image-capturing element. This is the only way in which it is possible to obtain a sharp scanned image, particularly when dealing with bent, wavy or uneven originals.

The scanning method with such a large-format scanning system thus has the following disadvantages:

On the one hand, the method is subject to increased wear of the glass plate due to the friction by the original on the glass plates, as well as due to the reflector roller, when the original is only partially between the reflector roller and the glass plate, and the reflector roller touches the glass plate.

Further, stitching errors occur due to the idling reflector rollers. Such reflector rollers are driven by the original. The necessary acceleration by the original is not even and cannot be compensated by known software methods, for example stitching processes.

Therefore, it is the object of the present invention to reduce the wear on the glass plates in a large-scale scanning system where the scanning quality is impaired due to the original and/or, when the original is only partially placed between the reflector roller and glass plate due to the reflector roller.

This object is attained according to the invention in a device as described above by the characteristics as specified in claim 1. Advantageous configurations can be seen in the dependent claims.

According to the invention, the object is attained in that for each image-capturing element there is one respective individually supported reflector roller of a length exceeding the effective length of the respective image-capturing element at both ends by an extent equal generally to a length of a roller region having a larger diameter than a center region of the reflector roller that extends along the respective image-capturing element plus the length of a respective reflector roller bearing, and in that a defined gap is formed between the reflector roller in the region of smaller diameter and the glass plate for receiving the original.

This means that the reflector rollers are configured such at the ends thereof that they touch the glass plate only outside the respective reading area of the image-capturing element for the original, and that the original rests against the glass plate in the center region of each of the reflector rollers. This can be achieved in that the reflector rollers have a larger diameters in the end regions thereof, or in that sleeves are attached to them in these areas, or in that, for example, spacer disks are used. This way, the only wear on the glass plate occurs outside the reading areas of the image-capturing elements and is caused by the original that is transported between the larger-diameter ends of the reflector rollers and the glass plate, and/or due to the larger-diameter end of the reflector roller itself for the reading action but non-harmful wear of the glass plate. Replacing the reflector roller, which covers the totality of the width of the glass plate, with a plurality of small reflector rollers renders the large-format scanning system cost-effective.

Advantageously, a defined gap can be formed between the reflector roller and the glass plate dimensioned such that, on the one hand, optimal contact of the original against the glass plate is ensured while, on the other hand, sufficient space is provided for the original.

It has been found that it is advantageous for the width of the gap to be smaller than or equal to the thickness of the original.

However, a gap having a thickness that is larger/equal to the thickness of the original is also possible. This way, wear of the glass plate would be virtually completely avoided. The gap must be adjusted such, however, that the original is in the focus area of the image-capturing elements to ensure that the scanning quality is not impaired.

According to the invention, small-format image-capturing elements can be in a cascade or zigzag array, arranged adjacent to each other.

The use of more expensive, driven reflector rollers is possible as well as a matter of fact; however, it is advantageous to provide a plurality of idling, small-format cascaded reflector rollers that are adjacent to each other. They are each allocated to a respective one of the image-capturing elements.

Remarkably, the reflector roller has a smooth-action slide bearing and a weight-optimized structural design, and the mass of the reflector roller is <0.285 g/mm. With this design, upon entry of the original into the gap between the glass plate and the reflector roller, the idling, easy-glide reflector roller is immediately accelerated, evenly and without jamming and stitching errors, to a peripheral speed corresponding to the speed of the original.

The invention is described in further detail below based on embodiments that are shown in the drawings. The following are shown:

Figure 1:
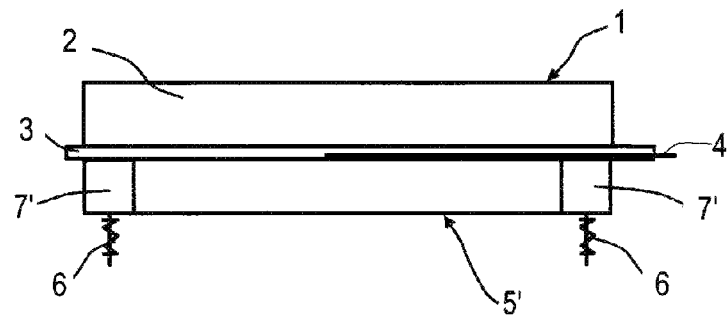
FIG. 1 is a known scanning system.

FIG. 1 shows a known scanning system 1 with an image-capturing element 2 that has a glass plate 3 in front of it. A reflector roller 5' presses an original 4 against the glass plate 3 by springs 6. The springs 6 therein engage by force application on the ends 7' of the reflector roller 5', thereby pressing the reflector roller 5' against the original 4. If the original 4 is, as shown, only partially between the reflector roller 5' and the glass plate 3, such that the reflector roller 5' is partially covered up by the original 4, the reflector roller 5' rubs on the glass plate 3, resulting in a high amount of wear. Otherwise, if the original 4 is completely between the reflector roller 5' and the glass plate 3, thus filling out the total length of the reflector roller 5', the original 4 wears away the glass plate 3.

Figure 2:
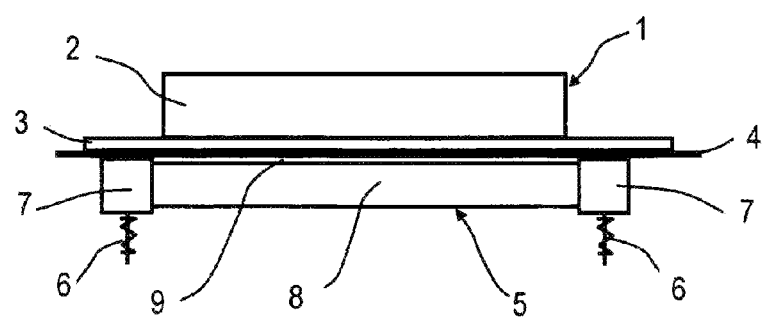
FIG. 2 is a scanning system with a reflector roller of a design according to the invention.

FIG. 2 shows a scanning system 1 according to the is invention with a reflector roller 5 where the ends 7 have a larger diameter than the center region 8 of the reflector roller 5. The original is essentially only pressed against the glass plate 3 at the ends of the reflector roller 5 that have the larger diameter and that are, furthermore, located outside the reading area of the image-capturing element 2. This way, a gap 9 is formed between the reflector roller 5 and the glass plate 3 in the center region 8 that has a defined size and ensures optimal contact of the original 4 against the glass plate 3. On the other hand, the gap 9 in the center region 8 of the reflector roller 5 provides a sufficient amount of space for the original 4.

Figure 3:
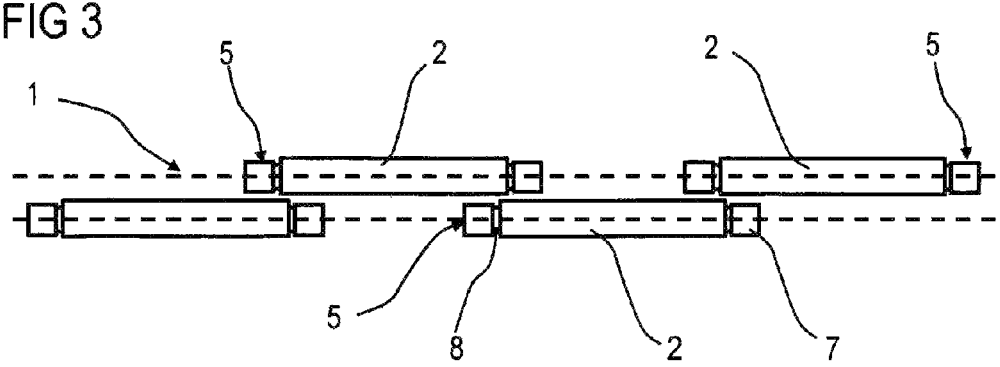
FIG. 3 is a scanning system with cascaded image-capturing elements.

FIG. 3 is a top view of a scanning system 1 with four image-capturing elements 2 for scanning a large-format original that are in a cascade or zigzag-like orientation. Each image-capturing element 2 has a idling reflector roller 5 with a diameter that is reduced in the center region 8 relative to the respective ends 7.

For reasons of cost-effectiveness, the design according to the invention provides for the use of CISs intended for small-format scanning systems as cascaded image-capturing element 2. Idling reflector rollers that are cascaded are also used for reasons of cost efficiency.

To reduce wear on the glass plate 3 by the original 4, the envisioned scanning method provides that the reflector rollers 5 only make contact outside the reading area of the image-capturing elements 2, so that wear on the glass plate that occurs with known scanning systems due to the contact pressure of the original 4 against the glass plate 3 is reduced.

Correspondingly, a defined gap 9 is always formed between the reflector roller 5 and the glass plate 3. The gap 9 is dimensioned such that, on the one hand, optimal contact of the original 4 with the glass plate 3 is ensured and, on the other hand, the original 4 is given a sufficient amount of space.

This way, the contact force between the original 4 and the glass plate 3, and thereby the wear on the glass plate 3 in the reading area of the image-capturing elements 2, is reduced and/or eliminated altogether.

The result is a considerable reduction of wear of the glass plate 3 due to the reflector roller 5 with partial covering of the reflector roller 5 by the original 4.

In known scanning methods, the reflector roller 5' is biased for example by springs 6 into contact with the glass plate 3 in the reading area of the image-capturing elements 2, with partial covering of the original. Rotation of the reflector roller 5' rubs the roller against the glass plate 3 in the reading area during the scanning process, thus causing increased wear.

In the scanning method according to the invention, the reflector roller 5 touches the glass plate 3, and also with partial covering of the original 4, only outside the reading area of the image-capturing elements 2, such that damage to the glass plate 3 caused by the reflector roller 5, as occurs with the known scanning method, can be precluded. This results in a considerable extension of the service life of the glass plate 3, and thereby a cost saving.

With idling reflector rollers 5' according to the methods of the prior art, image errors, so-called stitching errors, occur regularly, particularly in the overlap areas of the cascaded image-capturing elements 2, typically at the leading end of the original 4.

These image errors are caused by the fact that the reflector rollers 5' have no active drives but are rotated by the original 4 itself.

Non-calculable, non-linear speed changes of the original 4 occur due to the inertia of the reflector rollers 5', which cannot be reliably compensated for by known software methods, meaning stitching methods.

Once, with the increasing length of the original 4 over the transport of the original 4, the same speed is achieved between the original 4 and the image-capturing element 2, such image errors (stitching errors) can be reliably avoided by known software methods (stitching methods).

The reflector rollers 5 are characterized by a weight-optimized structural design and very easy sliding action. The reflector roller therein has a weight of <0.285 g/mm. In addition, contrary to the known methods, the reflector rollers 5 do not make contact with the glass plate 3 over the entire scanning length of the individual image-capturing elements 2 but only at the ends thereof. This results in a considerable reduction of friction. Owing to this optimized structural design, the original 4 is guided through the reading area of the image-capturing elements 2 almost perfectly uniformly, and the resulting stitching error is minimized. Any remaining inaccuracies can be reliably compensated by known software methods (stitching methods).

LIST OF REFERENCE SIGNS

1. Scanning system
2. Image-capturing element
3. Glass plate
4. Original
5. Reflector roller
6. Springs
7. Ends
8. Center region
9. Gap

The invention claimed is:

1. A large-format scanning system with at least two cascaded image-capturing elements, at least one platen, preferably a glass plate, in front of them, and respective cascaded reflector rollers opposite the image-capturing elements and pressed against the glass plate and/or an original by biasing elements at the ends of the reflector rollers, wherein for each image-capturing element there is one respective individually supported reflector roller of a length exceeding the effective length of the respective image-capturing element at both ends by an extent equal generally to a length of a roller region having a larger diameter than a center region of the reflector roller that extends along the respective image-capturing element plus the length of a respective reflector roller bearing, and in a defined gap is formed between the reflector roller in the region of smaller diameter and the glass plate for receiving the original.

2. The large-format scanning system according to claim 1, that wherein the gap is dimensioned such as a function of the thickness of the original that an optimal contact or an optimal pressure of the original against the glass plate is achieved.

3. The large-format scanning system according to claim 1, wherein the width of the gap is smaller/equal to the thickness of the original.

4. The large-format scanning system according to claim 1, wherein the width of the gap is greater/equal to the thickness of the original.

5. The large-format scanning system according to claim 1, wherein a plurality of small-format image-capturing elements are in a cascade or zigzag-like orientation adjacently relative to each other.

6. The large-format scanning system according to claim 1, wherein a plurality of idling, small-format reflector rollers are cascaded adjacent to each other.

7. The large-format scanning system according to claim 1, wherein the reflector rollers have slide bearings and a weight-optimized structural design, wherein the mass of the reflector roller is ≤0.285 g/mm.

8. A large-format scanning system comprising:
a glass plate over one face of which an original passes in a travel direction;
at least two image-capturing elements juxtaposed with an opposite face of the plate and cascaded to lie one after the other in the travel direction with ends overlapping transverse to the direction;
respective reflector rollers juxtaposed with the one face of the glass plate and each in direct alignment through the plate with a respective one of the image-capturing elements, each roller having a center region of a predetermined diameter and a pair of ends of a larger diameter; and
biasing means engaging the ends for pressing the roller ends against the original on the one face or directly against the one face while leaving between the center regions of the rollers and the one face of the plate a gap of predetermined width.

* * * * *